United States Patent
Bernett et al.

(10) Patent No.: US 6,735,043 B2
(45) Date of Patent: May 11, 2004

(54) DISC DRIVE PROTECTIVE COVER TO IMPROVE SHOCK ROBUSTNESS

(75) Inventors: Frank William Bernett, Longmont, CO (US); Kurt Michael Anderson, Louisville, CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/008,832

(22) Filed: Dec. 6, 2001

(65) Prior Publication Data

US 2002/0057522 A1 May 16, 2002

Related U.S. Application Data

(63) Continuation-in-part of application No. 09/535,091, filed on Mar. 24, 2000.
(60) Provisional application No. 60/133,024, filed on May 7, 1999, and provisional application No. 60/282,238, filed on Apr. 6, 2001.

(51) Int. Cl.[7] ............................................. G11B 17/02
(52) U.S. Cl. ................................................ 360/97.01
(58) Field of Search ........................ 360/97.01, 97.02, 360/97.03, 97.04, 98.01, 137

(56) References Cited

U.S. PATENT DOCUMENTS

| | | | | |
|---|---|---|---|---|
| 4,491,888 A | | 1/1985 | Brown et al. ............. 360/97.03 |
| 4,965,684 A | * | 10/1990 | Stefansky ................ 360/264.2 |
| 5,235,482 A | * | 8/1993 | Schmitz .................. 360/97.02 |
| 5,282,100 A | * | 1/1994 | Tacklind ................. 360/97.02 |
| 5,282,101 A | * | 1/1994 | Reinisch ................. 360/97.02 |
| 5,301,178 A | * | 4/1994 | Okabe .................... 369/77.1 |
| 5,469,311 A | | 11/1995 | Nishida et al. ......... 360/97.02 |
| 5,477,401 A | | 12/1995 | Squires et al. ............. 360/75 |
| 5,488,523 A | * | 1/1996 | Seaver ................... 360/99.12 |
| 5,502,604 A | * | 3/1996 | Furay .................... 360/97.01 |
| 5,537,270 A | | 7/1996 | Morehouse et al. ..... 360/97.02 |
| 5,602,700 A | * | 2/1997 | Viskochil et al. ........ 360/256.1 |
| 5,654,847 A | | 8/1997 | Yagi et al. .............. 360/97.02 |
| 5,677,811 A | * | 10/1997 | Kuno ..................... 360/97.01 |
| 5,796,557 A | * | 8/1998 | Bagnell et al. .......... 360/256.3 |
| 5,881,454 A | * | 3/1999 | Baxter ........................ 29/843 |
| 6,002,546 A | | 12/1999 | Yagi et al. .............. 360/97.02 |
| 6,023,392 A | * | 2/2000 | Kim ....................... 360/97.01 |
| 6,031,686 A | * | 2/2000 | Konno .................... 360/99.01 |
| 6,034,841 A | | 3/2000 | Albrecht et al. ......... 360/97.01 |
| 6,078,498 A | | 6/2000 | Eckerd et al. | |
| 6,097,608 A | * | 8/2000 | Berberich et al. .......... 361/752 |
| 6,172,842 B1 | * | 1/2001 | Satoh .................... 360/97.01 |
| 6,256,165 B1 | * | 7/2001 | Kim ....................... 360/97.01 |
| 6,288,866 B1 | * | 9/2001 | Butler ................... 360/97.01 |

FOREIGN PATENT DOCUMENTS

| | | |
|---|---|---|
| EP | 542 183 A2 | 5/1993 |
| EP | 0 917 036 A2 | 1/1999 |
| EP | 0 973 165 A1 | 1/2000 |

* cited by examiner

Primary Examiner—Robert S. Tupper
(74) Attorney, Agent, or Firm—Merchant & Gould P.C.

(57) ABSTRACT

A shock protection assembly for a disc drive includes a protective cover mounted as the lowest portion of the disc drive. The disc drive includes a base plate and two mounting rails, wherein a printed circuit board assembly is attached to the base plate between the two mounting rails. The protective cover is mounted to the base plate to cover a majority of the printed circuit board assembly while extending a predetermined distance below the mounting rails to shield the mounting rails and the base plate from contact. The shock protection assembly may further include a shock damper positioned between the protective cover and the printed circuit board assembly.

9 Claims, 3 Drawing Sheets

DISC DRIVE PROTECTIVE COVER TO IMPROVE SHOCK ROBUSTNESS

CROSS REFERENCE TO RELATED APPLICATIONS

This application is a continuation-in-part of U.S. patent application Ser. No. 09/535,091, filed Mar. 24, 2000, entitled "Damped Protective Cover to Improve Disc Drive Acoustics," which application claims the benefit of U.S. provisional application Serial No. 60/133,024, filed May 7, 1999, entitled "Damped PCBA Protective Cover to Improve Acoustics."

This application claims the benefit of U.S. provisional application Serial No. 60/282,238, filed Apr. 6, 2001, entitled "Protective Cover to Improve Shock Robustness."

FIELD OF THE INVENTION

This application relates to magnetic disc drives and more particularly to an improved protective cover for a disc drive that improves the ability of the disc drive to withstand strong shocks.

BACKGROUND OF THE INVENTION

Disc drives are data storage devices that store digital data in magnetic form on a rotating storage medium on a disc. Modern disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Much of the electronics that are essential to the operation of the disc drive are mounted on a printed circuit board assembly ("PCBA") that is typically mounted to a bottom surface or base plate of the disc drive. The PCBA includes electrical components that manage the operations of the disc drive. For example, the PCBA includes electrical components that control the speed of the spindle and position of the actuator arms over the discs. Similarly, the PCBA also includes electrical components that interface with the computer's processor.

The PCBA is typically attached to the disc drive base plate in a recessed region formed between two opposing mounting rails that extend from opposite sides of the base plate. The mounting rails extend downward and away from the base plate, and a bottom surface of each mounting rail includes threaded holes to provide for bottom mounting of the disc drive to a support surface (such as a drive bay within a computer). By positioning the PCBA within the recessed region formed between the two mounting rails, the mounting rails protect the PCBA from shocks (i.e., when the disc drive is dropped on a flat surface the mounting rails on either side of the PCBA will prevent the PCBA from contacting the surface).

While the mounting rails protect the PCBA from contacting a flat mounting surface, a majority of the PCBA is exposed between the mounting rails and is susceptible to damage, such as an electrostatic discharge, if a person handling the disc drive should touch a conductive element of the PCBA. In light of this danger, a protective cover may be attached to the disc drive assembly to protect the PCBA from exposure to electrostatic discharge. Such protective covers may comprise a flat metal sheet that fits within the recessed region formed between the two mounting rails to closely cover the PCBA. The protective covers minimize handling damage and reduce the problems associated with installing the disc drive within a computer.

However, when a protective cover over the PCBA is used, the protective cover can vibrate and increase the acoustic emissions from the disc drive. One way to reduce acoustic emissions from the protective cover was proposed by Bernett in the pending parent application entitled "Damped Protective Cover to Improve Disc Drive Acoustics," Ser. No. 09/535,091, filed Mar. 24, 2000. The Bernett application discloses a constrain layer that is secured to a surface of the PCBA protective cover. The constrain layer includes a damping member for damping the vibrations of the protective cover.

While the protective cover guards the PCBA against electrostatic discharges, and the constrain layer reduces the acoustic noise generated by the protective cover, neither the protective cover nor the constrain layer help to protect the internal disc drive components from physical shocks. This is due to the fact that the mounting rails extend below the level of the protective cover so that a bottom surface of the mounting rails form a mounting plane for making flush contact with a mounting surface. Thus, because both the PCBA and the protective cover are recessed between the mounting rails, the protective cover provides no mechanical shock protection when the disc drive is dropped on its base plate (i.e., when it is dropped on the mounting rails). Such impacts may be experienced by the disc drive during transport of the drive (such as by accidentally dropping the drive prior to installing the drive within a computer), as well as during industry standard "topple drop" tests. Rather than providing shock protection, the mounting rails impact the surface and transmit substantially the full force of the shock wave through the base plate to the internal components of the disc drive. The transmission of these large forces can cause the disc drive to fail, such as when the drive heads lift off the surface of the disc and crash back against the disc (the "head slap" phenomenon). Head slaps can damage the heads themselves as well as the surface of the disc, and can create debris within the disc drive that may ultimately lead to a head "crash." Similarly, where the disc drive employs a ramp for parking the heads when the drive is not energized, large impact forces can damage (e.g., bend) the suspensions which connect the heads to the actuator arms, thereby rendering the head non-operational.

Previous attempts to cushion the drive from external shocks have included adding bumpers or cushions to the base plate and mounting rails of the disc drive. However, such bumpers/cushions do not provide an optimal solution because (1) the bumpers constitute additional parts and therefore raise the cost and complexity of manufacturing the disc drive; and (2) the bumpers may interfere with the smooth bottom plane formed by the mounting rails, thereby making it difficult to effectively bottom mount the disc drive.

Accordingly, there is a need for improving the shock robustness of a disc drive without adding additional components such as bumpers. The present invention provides a solution to this and other problems, and offers other advantages over the prior art.

SUMMARY OF THE INVENTION

The present invention relates to a disc drive having a shock protection assembly that reduces the shock force applied to internal disc drive components when the disc drive is subjected to a shock force from beneath the disc drive, such as during transport of the disc drive prior to assembly of the disc drive within a computer.

In accordance with one embodiment of the present invention, a disc drive includes a top cover, a base plate, and a printed circuit board assembly mounted to the base plate between two mounting rails which extend downward from a bottom surface of the base plate. The disc drive includes a protective cover mounted to the base plate to cover a majority of the printed circuit board assembly. The protective cover extends a predetermined distance below the mounting rails to shield the mounting rails and the base plate from contact during a shock event. In one embodiment of the invention, the predetermined distance is approximately one millimeter. In a further embodiment of the invention, a shock damper is positioned between the protective cover and the printed circuit board assembly. The shock damper may comprise a layer of energy absorbing foam which extends between and contacts both the protective cover and the printed circuit board assembly.

The present invention can also be implemented as a shock protection assembly for a disc drive having a base plate and two mounting rails extending downward from a bottom surface of the base plate, wherein a printed circuit board assembly is attached to the base plate between the two mounting rails. The shock protection assembly includes a protective cover having mounting tabs extending upward above the cover to secure the cover to the base plate while maintaining the cover suspended a predetermined distance below the mounting rails. In one preferred embodiment, the shock protection assembly further comprises a shock damper positioned between the protective cover and the printed circuit board assembly.

The present invention can further be implemented as a disc drive having a base plate and two mounting rails which extend downward from a bottom surface of the base plate. A printed circuit board assembly is mounted to the base plate between the two mounting rails. The disc drive includes a protective cover and means for damping shock forces applied to internal components of the disc drive when the shock force is applied from beneath the disc drive in the direction of the base plate, such as during transport of the drive or during a "drop test." In one preferred embodiment, the means for dampening shock forces includes means for attaching the protective cover to the base plate so that the cover extends a predetermined distance below the mounting rails. In a further preferred embodiment, the means for dampening shock forces further includes a shock damper positioned between the protective cover and the printed circuit board assembly.

These and various other features as well as advantages which characterize the present invention will be apparent from a reading of the following detailed description and a review of the associated drawings.

DETAILED DESCRIPTION

Figure 1:
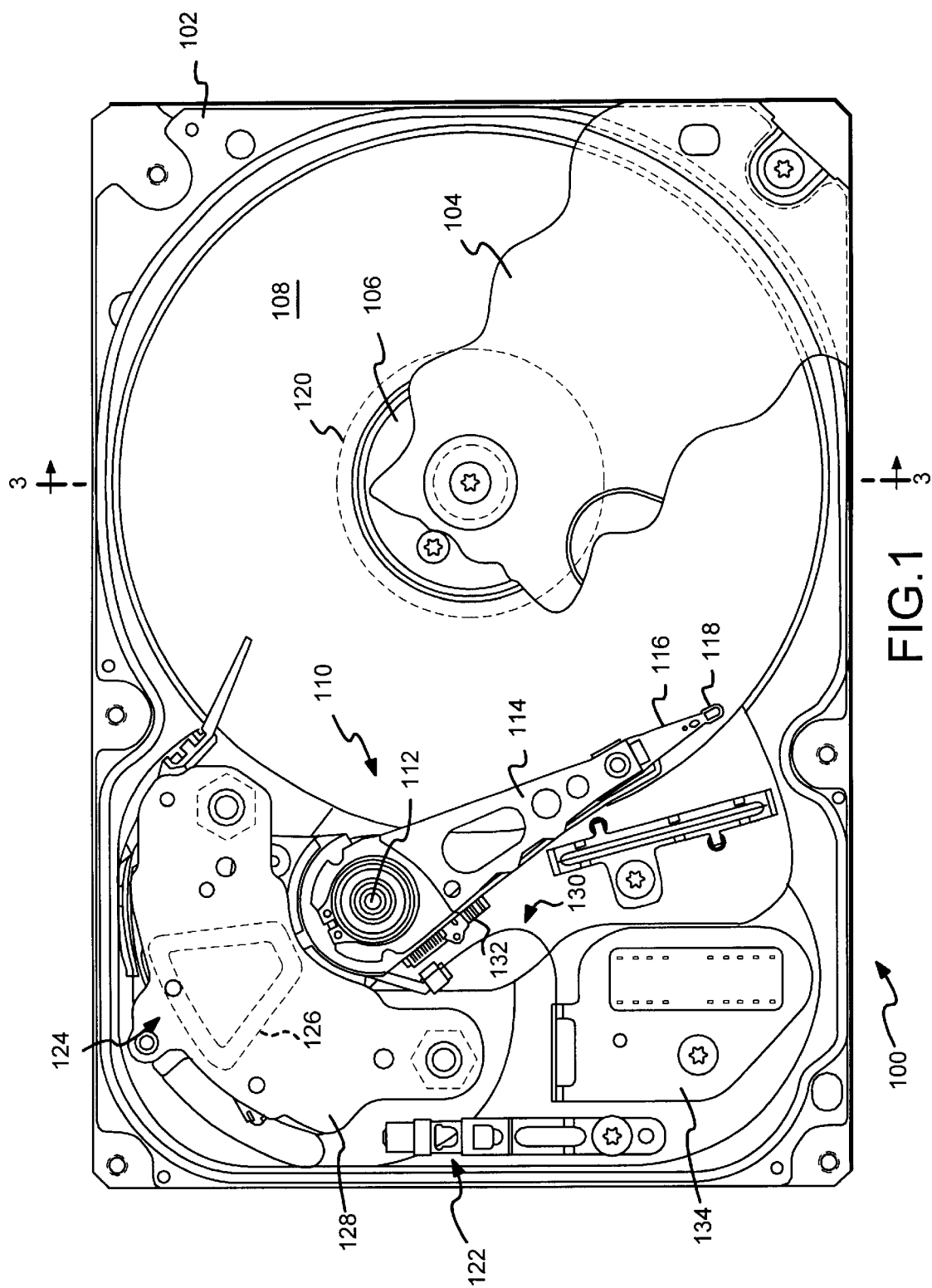
FIG. 1 is a top plan view of a disc drive assembly having a protective cover in accordance with a preferred embodiment of the present invention, with a top cover of the disc drive assembly partially broken away.

A disc drive 100 constructed in accordance with a preferred embodiment of the present invention is shown in FIG. 1. The disc drive 100 includes a base plate 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement 122, which prevents inadvertent rotation of the actuator arms 114 when the heads are parked. Alternatively, in the case of a Load/Unload disc drive, the heads 118 may be secured within the grooves of a loading ramp (not shown) when the motor is de-energized.

The radial position of the heads 118 is controlled through the use of a voice coil motor 124, which typically includes a coil 126 attached to the actuator assembly 110, as well as one or more permanent magnets and return plates 128 which are spaced apart to establish a vertical magnetic field within which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base plate 102 to a disc drive printed circuit board assembly (PCBA) 200 (FIGS. 2 and 3) mounted to the bottom side of the disc drive base plate 102.

Figure 2:
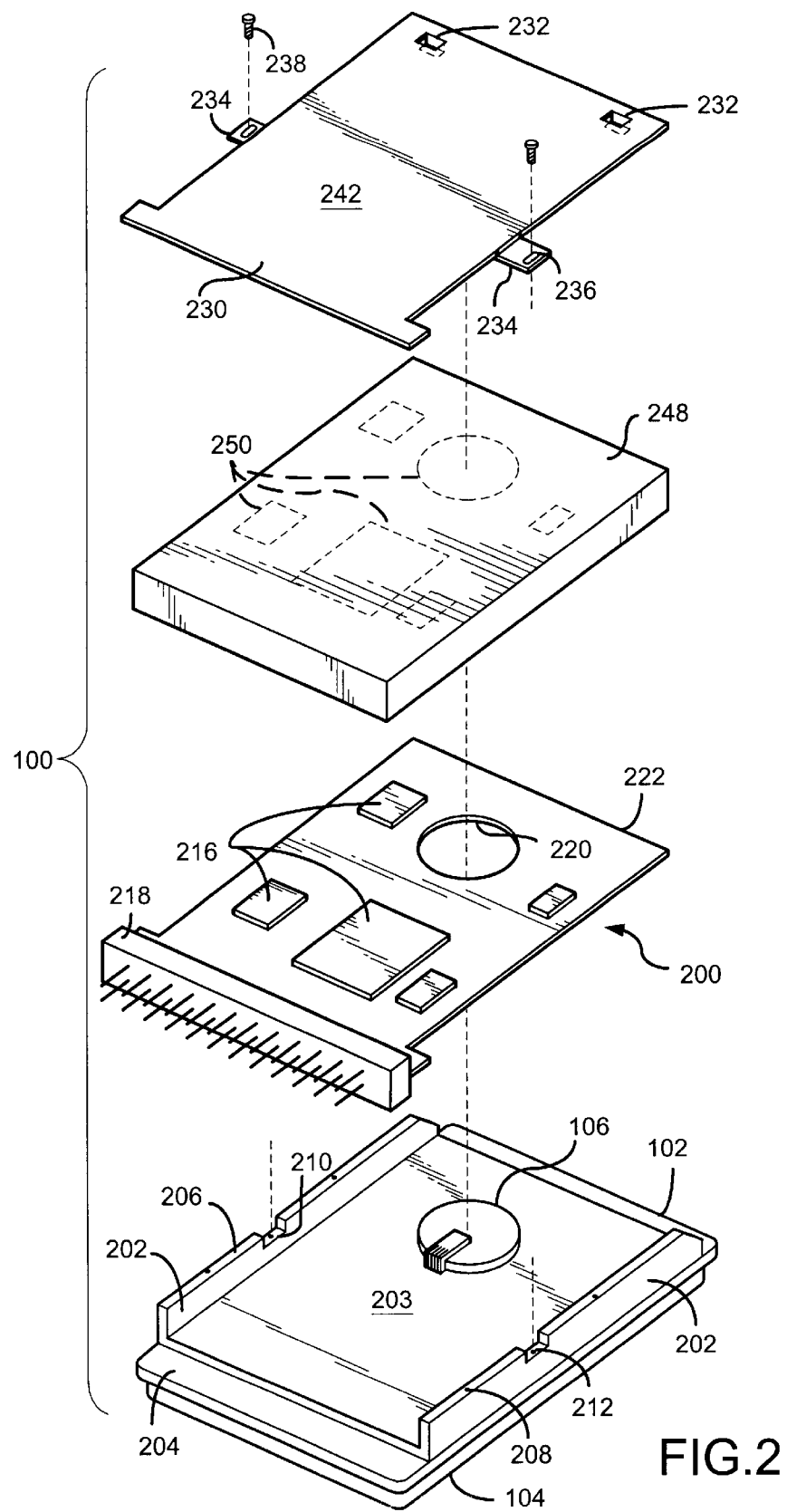
FIG. 2 is an exploded perspective view of a bottom portion of the disc drive assembly of FIG. 1 illustrating one preferred embodiment of a protective cover and shock damper in accordance with the present invention.

Referring now to FIG. 2, a perspective exploded view of the major components on the bottom of the disc drive assembly 100 is shown. The disc drive assembly top cover 104 is shown attached to the disc drive base plate 102. A bottom surface 203 of the disc drive base plate 102 defines two opposing mounting rails 202 which extend along substantially the entire length of the base plate 102. The base plate 102 is preferably formed from aluminum, and the mounting rails 202 are formed integrally with the base plate 102, such as by a casting or machining process. The mounting rails 202 stop at a recessed region 204 of the base plate to allow for the mounting of a connector on the PCBA 200 as described below. Additionally, FIG. 2 illustrates that a bottom portion of the spindle motor 106 extends through an opening formed in the base plate 102 of the disc drive assembly 100.

A bottom surface 206 of each mounting rail 202 includes a pair of threaded holes 208 for bottom mounting the disc drive assembly 100 to a support surface (not shown). An outer surface of the rails may also include threaded holes (not shown) for side mounting the disc drive assembly 100 within a drive cage of a computer. Furthermore, each mounting rail 202 may include a cutout or notch 210, and each notch 210 includes its own threaded hole 212 as described in greater detail below.

FIG. 2 illustrates the PCBA 200 adapted for mounting to the bottom surface of the disc drive base plate 102 in a conventional manner. The PCBA 200 has a length dimension that is less than or equal to a length of the base plate 102, and a width dimension that is slightly less than the width between the opposing mounting rails 202. The PCBA 200 includes a number of electrical components 216 used for managing the operations of the disc drive and for interfacing with the host computer via an edge connector 218. The PCBA 200 further defines an opening 220 adjacent a rear edge 222 of the PCBA for receiving the bottom portion of the spindle motor 106 that extends through the base plate 102. Thus, during mounting of the PCBA 200 to the base plate 102, the opening 220 provides clearance for the spindle motor 106 and the recessed region 204 of the base plate 102 provides clearance for the edge connector 218, thereby allowing the PCBA to sit flush against the bottom surface of the base plate 102.

FIG. 2 further illustrates a protective cover 230 which is adapted to be mounted to the base plate 102 between the two mounting rails 202. As described below, the protective cover 230 is fastened to the base plate 102 so that the cover extends over the entire length of the PCBA 200, thereby protecting it from electrostatic damage and other potential handling damage. The protective cover 230 is a generally flat metal plate and, in the preferred embodiment, is formed from a cold rolled steel having a nominal thickness of approximately 0.5 millimeters. The cover 230 is similar in shape to the PCBA 200 and includes retaining members 232 for engaging the rear edge 222 of the PCBA 200. The cover 230 further preferably includes a pair of mounting tabs 234 extending from either side of the cover 230. Each mounting tab 234 defines a mounting hole 236, and each tab 234 is displaced vertically downward from the remainder of the cover 230, as shown in FIG. 2.

Figure 3:
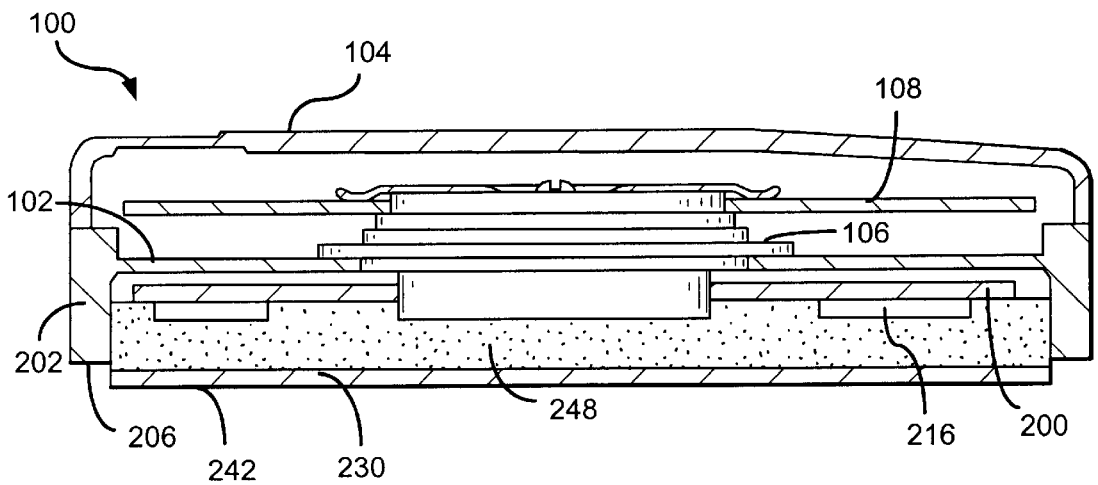
FIG. 3 is a cross-sectional view through the disc drive assembly taken substantially along the line 3—3 in FIG. 1.
Figure 4:
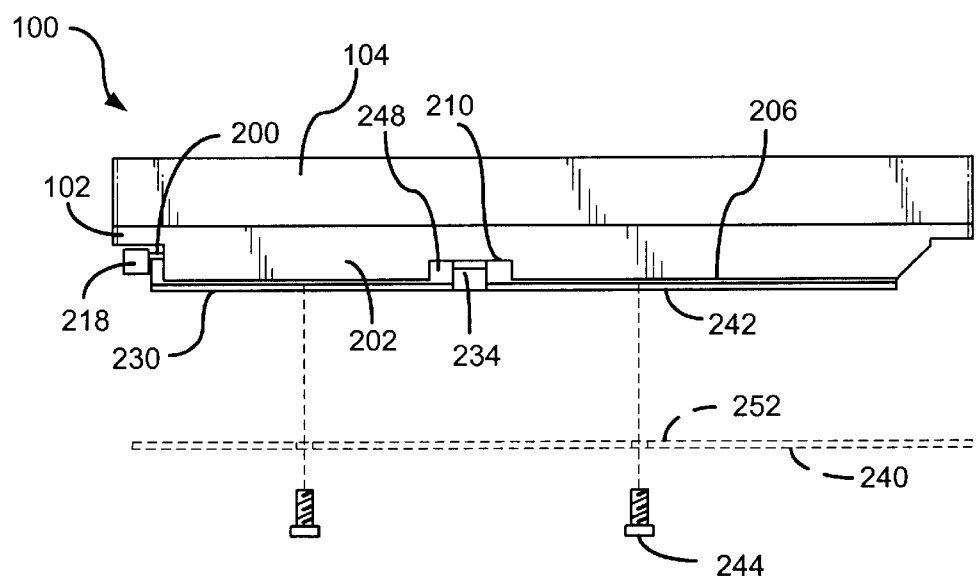
FIG. 4 is a side elevational view of the disc drive assembly of FIG. 1 illustrating the protective cover extending below a mounting rail of the disc drive assembly in accordance with a preferred embodiment of the present invention, and further showing a support surface (in phantom) to which the mounting rails are attached.

The protective cover 230 is preferably mounted to the bottom surface of the base plate 102 by simultaneously aligning the retaining members 232 with the rear edge 222 of the PCBA and the tabs 234 with the respective notches 210 formed in the mounting rails 202. Threaded fasteners 238 are then utilized to secure the cover 230 to the rails 202. The use of the notches 210 allows the tabs 234 and the fasteners 238 to be recessed below the bottom surface 206 of the mounting rails 202, thereby preventing interference when bottom mounting the disc drive assembly 100 to a support surface 240 (FIG. 4). However, despite recessing the tabs 234 and fasteners 238 within the mounting rails 202, the present invention establishes the size (i.e., the height) of the mounting rails 202, the depth of the notches 210, and the vertical offset of the mounting tabs 234 so that a bottom surface 242 of the protective cover 230 extends slightly below the bottom surface 206 of the mounting rails 202, as shown in FIGS. 3 and 4. Additionally, well-known alternative mounting surfaces may be employed to secure the protective cover 230 to the base plate 102. In one alternative embodiment, mounting bosses (not shown) positioned between the mounting rails 202 extend through or around the PCBA and include a threaded opening to provide for mounting the cover 230. Regardless of whether the protective cover 230 is mounted on the rails 202 or on some alternative surface, it is important that the bottom surface 242 of the cover 230 extends below the mounting 202 rails as described above.

Configured in this manner, the bottom surface 242 of the protective cover 230 becomes the lowest point of the disc drive assembly 100 so that the disc drive assembly 100 rests on the protective cover 230 rather than the bottom surface 206 of the mounting rails 202. Extending the protective cover 230 below the level of the mounting rails 202 ensures that the cover 230 rather than the mounting rails 202 will initially impact a support surface, such as a test surface during a drop test. Due to the fact that the protective cover 230 is formed from a more forgiving material than the mounting rails 202 (i.e., cold rolled steel rather than aluminum), and further given that the protective cover 230 is not formed integrally with the base plate 102, the cover 230 itself acts as a shock absorber to reduce the force of the shock that is transmitted to the base plate 102. In a preferred embodiment, the bottom surface 242 of the protective cover 230 extends approximately 1.0 millimeter below the bottom surface 206 of the mounting rails 202. However, the present invention encompasses distances both less than and greater than 1.0 millimeter provided that the protective cover 230 acts to reduce the shock experienced by the internal drive components (in comparison to the shock experienced when the mounting rails 202 are the lowest portion of the drive assembly 100), while still permitting the drive assembly 100 to be bottom mounted via the threaded holes 208. That is, while the gap between the bottom surface 242 of the protective cover 230 and the bottom surface 206 of the mounting rails 202 is sufficiently large (e.g., one millimeter) to ensure that the cover 230 will hit first when the drive is dropped on its base plate 102, that same gap is also sufficiently small to allow mounting screws 244 (FIG. 4) to bridge the gap (i.e., the distance between the bottom surface 206 of the mounting rails 202 and the support surface 240) when the drive assembly 100 is bottom mounted to the support surface 240.

Prior usage of the protective cover, such as described in the parent patent application Ser. No. 09/535,091), have required the cover to be recessed or positioned above the bottom surface of the mounting rails. In order to achieve the desired extension of the protective cover 230 below the bottom surface 206 of the mounting rails 202 (e.g., one millimeter), it is preferred that the overall height of the mounting rails 202 be reduced (e.g., by slightly more than one millimeter) so that the overall height dimension of the disc drive assembly 100 remains substantially the same.

While the protective cover 230 can act as a shock absorber on its own, due mainly to the relatively softer metal used to form the protective cover 230, the present invention also preferably includes a shock damper positioned between the PCBA 200 and the protective cover 230 as shown in FIGS. 2 and 3. In the preferred embodiment, the shock damper comprises a layer of energy absorbing foam 248 that is preferably sized to cover substantially the entire surface area of both the PCBA 200 and the protective cover 230. The foam layer 248 preferably includes cutaway portions 250 for receiving the different electrical components 216 contained on the PCBA 200, as shown in outline in FIG. 2 and in cross-section in FIG. 3.

The layer of energy absorbing foam 248 preferably has a thickness that is sufficient to fill substantially the entire gap between the PCBA 200 and the protective cover 230, thereby providing maximum cushioning when the protective cover 230 suffers an impact. In the preferred embodiment illustrated in FIG. 3, the layer of energy absorbing foam 248 is approximately 4.0 millimeters thick, although variations in the thickness of the foam layer are encompassed by the present invention. Furthermore, the energy absorbing foam layer 248 preferably comprises an elastomeric foam that is sufficiently stiff to reduce or eliminate contact between the protective cover 230 and the mounting rails 202 during a shock event. Simultaneously, the layer 248 is sufficiently elastic to absorb a portion of the shock force (rather than transmitting the entirety of the shock force to the PCBA 200), thereby enhancing the ability of the disc drive assembly 100 to survive an accidental impact to the base plate 102 or pass an industry "drop test." The inclusion of the cutaway portions 250 allows the foam layer 248 to spread the shock force evenly over substantially the entire surface of the PCBA 200 without applying excessive forces to one or more of the electrical components 216. Alternatively, foam inserts (not shown) rather than a solid layer 248 could be placed between the electrical components 216 to provide for cushioning and energy damping between the protective cover 230 and the PCBA 200.

FIG. 4 illustrates the disc drive assembly 100 suspended above a support surface 240 which is shown in phantom. The support surface 240 may comprise the base of a drive bay within a computer case (not shown). The drive assembly 100 is bottom mounted to the surface 240 by first positioning the protective cover 230 on the support surface 240 so that the threaded holes 208 on the bottom surface 206 of the mounting rails 202 are suspended above matching holes 252 formed in the support surface 240. Screws 244 are then connected through both the holes 252 and the holes 208 to secure the mounting rails 202 to the support surface 240. As noted above, the screws 244 are of sufficient length to bridge the gap between the support surface 240 and the mounting rails 202 (e.g., the one millimeter gap created by the preferred positioning of the protective cover 230 one millimeter below the bottom surface 206 of the mounting rails 202). Furthermore, due to the viscoelastic nature of the foam layer 248, the screws 244 may be tightened down to compress the foam layer while pulling the mounting rails 202 downward onto the support surface 240. Alternatively, the screws 244 need not be tightened to such a high degree but rather may just be tightened to the extent necessary to fix the drive assembly 100 in place while leaving the mounting rails 202 suspended above the surface 240. In this manner, the foam layer 248 is in a less-compressed state and therefore may be more effective at reducing operational shocks experienced by the drive assembly 100 (such as shocks to the computer housing to which the drive is mounted). Thus, while the protective cover 230 and the foam layer 248 are primarily intended to reduce the damage caused by handling the drive prior to installation within a computer (such as dropping the drive assembly 100 on the base plate 102), the foam layer 248 may also serve to protect the drive assembly 100 even after the drive is mounted to the support surface 240.

The present invention achieves a reduction in the shock level which is experienced by internal drive components, and also increases or lengthens the duration of the shock event. Thus, the protective cover 230 and the foam layer 248 reduce the effects of the shock force on the internal components of the disc drive assembly 100, thereby increasing the chances that the drive will survive or pass the drop test. For example, drop tests conducted with the protective cover 230 and the foam layer 248 of the present invention have resulted in 50% reductions in acceleration force (i.e., "g-force") measured at an internal location within the drive. With this level of damping, the disc drive heads remain on the disc surface during the shock event, thereby eliminating the above-described head slap phenomenon.

In summary, a disc drive (such as 100) in accordance with an exemplary preferred embodiment of the present invention has a top cover (such as 104), a base plate (such as 102), and a printed circuit board assembly (such as 200) mounted to the base plate (such as 102) between two mounting rails (such as 202) which extend downward from a bottom surface (such as 203) of the base plate (such as 102). The disc drive (such as 100) includes a protective cover (such as 230) mounted to the base plate (such as 102) substantially between the two mounting rails (such as 202) to cover a majority of the printed circuit board assembly (such as 200). The protective cover (such as 230) extends a predetermined distance below the mounting rails (such as 202) to shield the mounting rails and the base plate (such as 102) from contact during a shock event.

In preferred embodiments of the invention, the protective cover (such as 230) is formed from cold steel having a thickness of approximately 0.5 millimeters, and the predetermined distance between the bottom surface (such as 242) of the protective cover (such as 230) and the bottom surface (such as 206) of the mounting rails (such as 202) is approximately one millimeter. The protective cover (such as 230) may also include mounting tabs (such as 234) extending from opposite sides of the protective cover, each mounting tab (such as 234) is secured to the base plate (such as 102), and is preferably secured within a notch (such as 210) formed in one of the mounting rails (such as 202), to maintain the protective cover (such as 230) suspended the predetermined distance below the mounting rails.

Furthermore, the disc drive (such as 100) may include a shock damper positioned between the protective cover (such as 230) and the printed circuit board assembly (such as 200).

In a preferred embodiment, the shock damper comprises a layer of energy absorbing foam (such as 248) which extends between and contacts both the protective cover (such as 230) and the printed circuit board assembly (such as 200). In one preferred embodiment, the foam layer (such as 248) is approximately four millimeters thick.

In another exemplary preferred embodiment of the present invention, a shock protection assembly for a disc drive (such as 100) including a base plate (such as 102) having two mounting rails (such as 202) extending downward from a bottom surface (such as 203) of the base plate, and further includes a printed circuit board assembly (such as 200) attached to the base plate (such as 102) between the two mounting rails (such as 202). The shock protection assembly includes a protective cover (such as 230) having mounting tabs (such as 234) extending from opposite sides of the cover (such as 230). The mounting tabs (such as 234) extend upward above the cover (such as 230) to secure the cover to the base plate (such as 102), and preferably to the mounting rails (such as 202), while maintaining the cover (such as 230) suspended a predetermined distance below the mounting rails (such as 202). In one preferred embodiment, the shock protection assembly further comprises a shock damper which is preferably formed from an energy absorbing foam layer (such as 248) positioned between the protective cover (such as 230) and the printed circuit board assembly (such as 200).

In yet a further exemplary preferred embodiment of the present invention, a disc drive (such as 100) has a base plate (such as 102) and two mounting rails (such as 202) which extend downward from a bottom surface (such as 203) of the base plate (such as 102). A printed circuit board assembly (such as 200) is mounted to the base plate (such as 102) between the two mounting rails (such as 202). The disc drive (such as 100) includes a protective cover (such as 230) and means (such as 230 and 248) for dampening shock forces applied to internal components (such as 108, 114, 116 and 118) of the disc drive (such as 100) when the shock force is applied from beneath the disc drive in the direction of the base plate (such as 102), such as during a "drop test" or as a result of an accidental impact during transport of the disc drive. In one preferred embodiment, the means for dampening shock forces includes means (such as 210 and 234) for attaching the protective cover (such as 230) to the base plate (such as 102) so that the cover (such as 230) extends a predetermined distance below the mounting rails (such as 202). In a further preferred embodiment, the means for dampening shock forces further includes a shock damper (such as 248) positioned between the protective cover (such as 230) and the printed circuit board assembly (such as 200).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. For example, while the preferred embodiment of the invention is shown with a metal protective cover 230 having a rectangular shape and a predetermined thickness of approximately 0.5 millimeters, it is understood that the protective cover may be formed from other materials (such as plastic) and may take other shapes, provided that the cover protects the PCBA while extending below the lowest point of the base plate (e.g., the mounting rails). Thus, it is envisioned that any type of protective cover may be encompassed by the current invention provided that the cover absorbs a portion of the impact force to reduce the shock force transferred to the internal drive components, as described above. Additionally, alternative shock dampers (such as springs) may be used in place of the foam layer described above. Accordingly, all such modifications, changes and alternatives are encompassed in the spirit of the invention disclosed and as defined in the appended claims.

What is claimed is:

1. A disc drive comprising:

a top cover;

a base plate attached to the top cover;

two mounting rails extending downward from a bottom surface of the base plate, each mounting rail adapted to secure the disc drive to a support surface, the mounting rails being made of a first material;

a printed circuit board assembly ("PCBA") attached to the bottom surface of the base plate between the two mounting rails, such that the mounting rails extend below the PCBA; and a shock absorbing protective cover mounted to the base plate to cover a majority of the PCBA, the protective cover extending a predetermined distance below the mounting rails wherein the protective cover is made of a second material that is more absorptive to an applied shock than the first material, wherein the protective cover includes mounting tabs extending from opposite sides of the protective cover, the mounting tabs secured to mounting surfaces on the base plate to maintain the protective cover suspended the predetermined distance below the mounting rails, the mounting surfaces comprise the two mounting rails and each mounting rail defines a notch for receiving one of the mounting tabs.

2. A disc drive comprising:

a top cover;

a base plate attached to the top cover;

two mounting rails extending downward from a bottom surface of the base plate, each mounting rail adapted to secure the disc drive to a support surface;

a printed circuit board assembly ("PCBA") attached to the bottom surface of the base plate between the two mounting rails, such that the mounting rails extend below the PCBA;

a protective cover mounted to the base plate to cover a majority of the PCBA, the protective cover extending a predetermined distance below the mounting rails; and a shock damper positioned between the protective cover and the PCBA wherein the shock damper comprises a layer of energy absorbing foam sufficiently thick to contact both the protective cover and the PCBA.

3. The disc drive of claim 2 wherein the foam layer is approximately four millimeters thick.

4. The disc drive of claim 2 wherein the protective cover is formed from a metal sheet having a thickness of approximately 0.5 millimeters.

5. The disc drive of claim 2 wherein the predetermined distance is approximately 1.0 millimeters.

6. A shock protection assembly for a disc drive including a base plate having two mounting rails made of a first material extending downward from a bottom surface of the base plate beyond a printed circuit board assembly ("PCBA") attached to the bottom surface of the base plate between the two mounting rails, the shock protection assembly comprising:

a shock absorbing protective cover having mounting tabs extending from opposite sides of the protective cover, each mounting tab extending upward above the protective cover to secure the protective cover to a respective mounting surface on the base plate while maintaining the protective cover suspended a predetermined distance below the mounting rails wherein the protective cover is made of a second material that is more absorptive to an applied shock than the first material, wherein each mounting rail defines a notch for receiving one of the mounting tabs.

7. A disc drive including a base plate having two mounting rails extending downward from a bottom surface of the base plate and a printed circuit board assembly ("PCBA") attached to the bottom surface of the base plate between the two mounting rails, the disc drive comprising:

a protective cover; and means for dampening shock forces applied to internal components of the disc drive when a shock force is applied from beneath the disc drive in the direction of the base plate.

8. The disc drive of claim 7 wherein the means for dampening shock forces includes means for attaching the protective cover to the base plate so that the protective cover extends a predetermined distance below the mounting rails.

9. The disc drive of claim 8 wherein the means for dampening shock forces includes a shock damper positioned between the protective cover and the PCBA.

* * * * *